United States Patent
Sukup et al.

(10) Patent No.: US 10,423,134 B2
(45) Date of Patent: Sep. 24, 2019

(54) INTERMEDIATE SUMP WARNING SYSTEM

(71) Applicant: SUKUP MANUFACTURING CO., Sheffield, IA (US)

(72) Inventors: Eugene G. Sukup, Hampton, IA (US); Graham Giddings, Sheffield, IA (US); Elizabeth Brinkman, Greene, IA (US); Randal L. Marcks, St. Ansgar, IA (US); Charles E. Sukup, Dougherty, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 10 days.

(21) Appl. No.: 15/860,153

(22) Filed: Jan. 2, 2018

(65) Prior Publication Data

US 2018/0120799 A1    May 3, 2018

Related U.S. Application Data

(63) Continuation-in-part of application No. 15/098,803, filed on Apr. 14, 2016.

(51) Int. Cl.
| | |
|---|---|
| G05B 15/02 | (2006.01) |
| G08B 21/18 | (2006.01) |
| B65G 65/34 | (2006.01) |
| A01D 41/12 | (2006.01) |
| G08B 7/02 | (2006.01) |

(52) U.S. Cl.
CPC ......... *G05B 15/02* (2013.01); *A01D 41/1217* (2013.01); *B65G 65/34* (2013.01); *G08B 7/02* (2013.01); *G08B 21/18* (2013.01)

(58) Field of Classification Search
CPC ................................. G08B 21/18; A01F 25/14
See application file for complete search history.

(56) References Cited

U.S. PATENT DOCUMENTS

| | | | |
|---|---|---|---|
| 4,641,124 A | 2/1987 | Davis | |
| 6,052,052 A * | 4/2000 | Delmonaco | G08B 25/08 340/287 |
| 2005/0171634 A1 * | 8/2005 | York | A47K 5/06 700/231 |
| 2007/0279165 A1 | 12/2007 | Gilmore | |
| 2012/0003066 A1 | 1/2012 | Niemeyer et al. | |
| 2015/0075263 A1 | 3/2015 | Koch et al. | |
| 2016/0203687 A1 | 7/2016 | Lee | |

* cited by examiner

*Primary Examiner* — Quan-Zhen Wang
*Assistant Examiner* — Rajsheed O Black-Childress
(74) *Attorney, Agent, or Firm* — Zarley Law Firm, PLC

(57) ABSTRACT

An intermediate sump warning system having a sensor associated with a gate of an intermediate sump. The sensor is connected to a controller that activates a warning signal when the sensor detects that the gate is in an open position. The controller also deactivates the unloading system when the gate is open.

22 Claims, 2 Drawing Sheets

INTERMEDIATE SUMP WARNING SYSTEM

CROSS REFERENCE TO RELATED APPLICATION

This application is a continuation-in-part of U.S. patent application Ser. No. 15/098,803 filed Apr. 14, 2016.

BACKGROUND OF THE INVENTION

This invention is directed to a warning system for grain bins, and more particularly, a system that provides a warning signal when an intermediate sump is open.

Bins for storing grain are well-known in the art. Grain is removed from the bin through a centrally located sump and intermediate sumps. Typically, the intermediate sumps should not be opened when the bin is too full as the opening causes the sidewall sheets to be pulled in resulting in catastrophic bin failure if not caught immediately, and at least damage to the bin. Therefore, a need exists in the art for a system that addresses these deficiencies.

Therefore, an objective of the present invention is to prevent grain bin damage and failure.

Another objective of the present invention is to improve safety related to grain bin operation.

These and other objectives will be apparent to one skilled in the art based upon the following written description, drawings and claims.

SUMMARY OF THE INVENTION

An intermediate sump warning system having a sensor associated with a gate of an intermediate sump. The sensor detects when the gate has rotated from a closed position to an open position and sends a signal to a controller. Upon detection of an open gate, the controller activates a warning signal such as a voice command, an arbitrary sound, and/or flashing lights.

Also, the controller prevents further operation of unloading equipment until passed with a key lock out switch.

DETAILED DESCRIPTION OF THE PREFERRED EMBODIMENT

Figure 1:
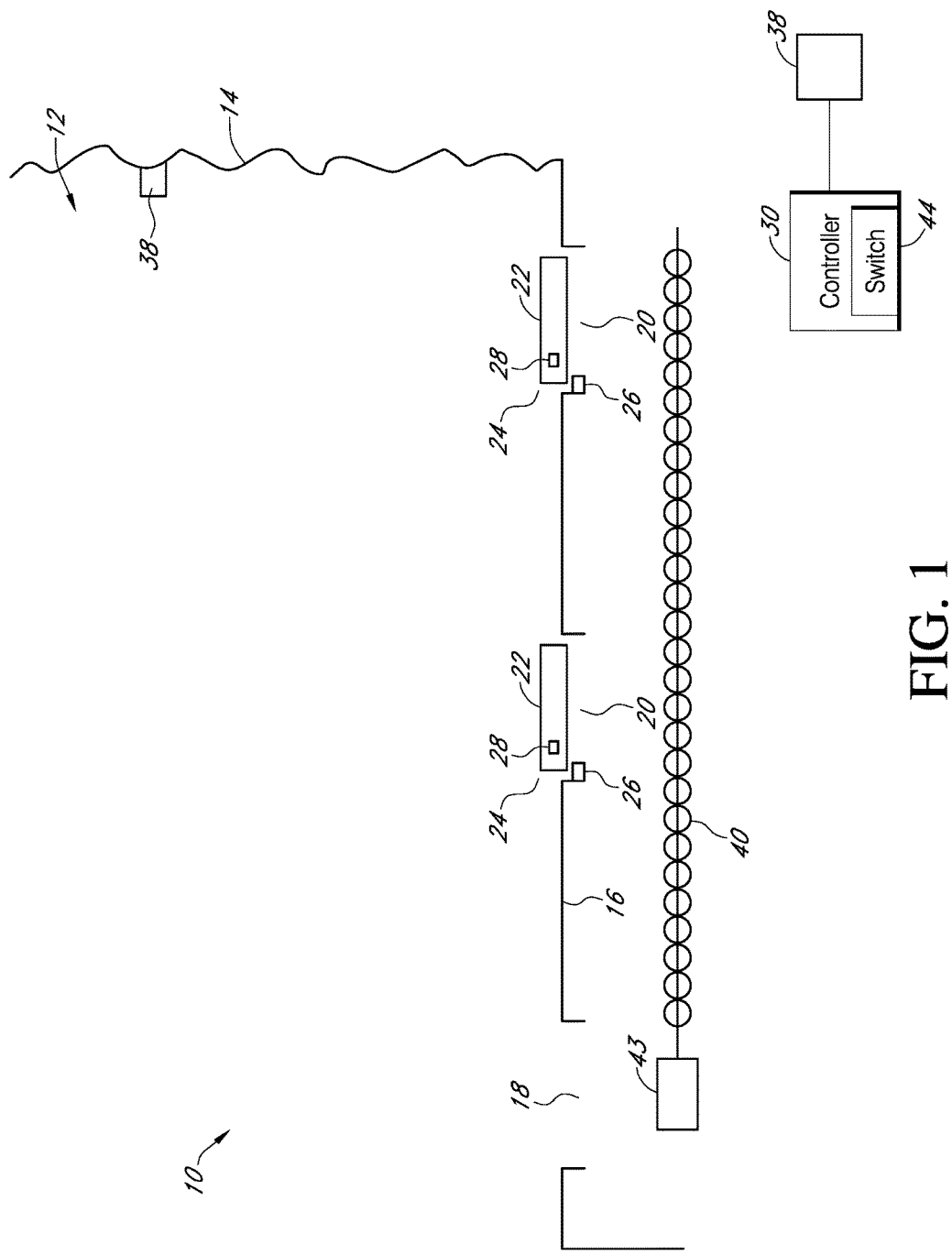
FIG. 1 is a side sectional view of a grain bin.
Figure 2:
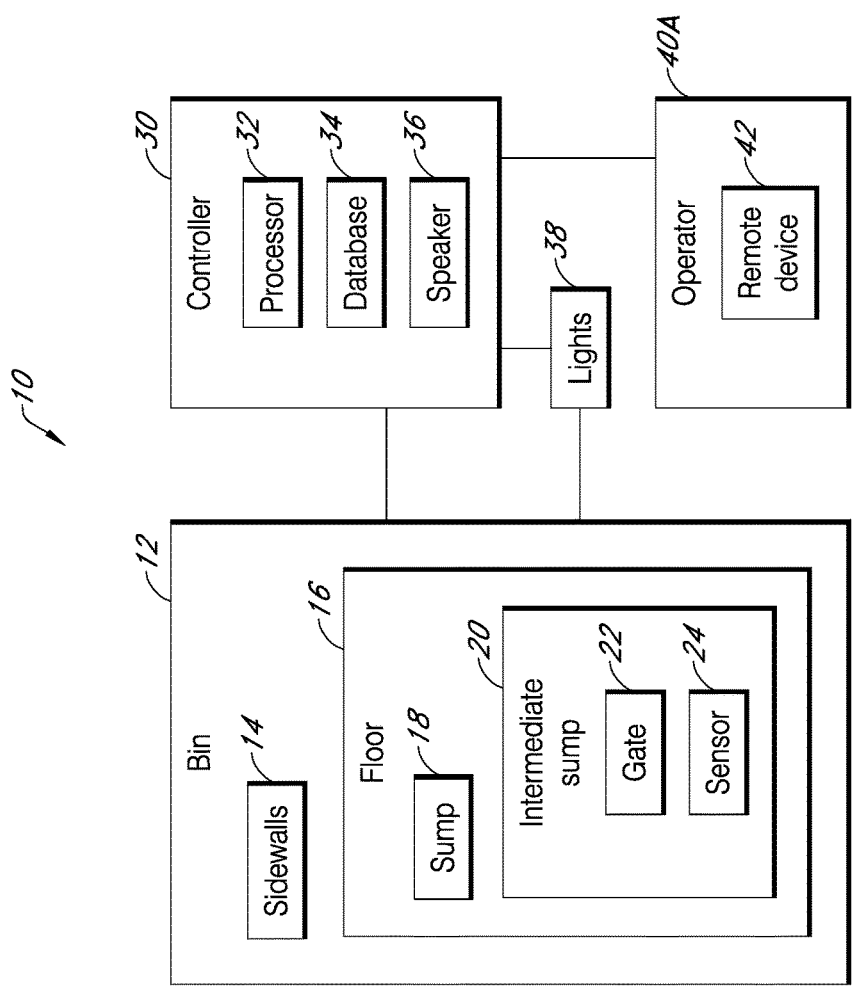
FIG. 2 is a block diagram of the environment for a sump warning system.

Referring to the figures, an intermediate sump warning system 10 is used in relation to a bin 12 for storing grain. The bin 12 has a sidewall 14 and a floor 16. Disposed within the floor 16 is a centrally located sump 18 and intermediate sumps 20 positioned between the central sump 18 and the sidewall 14. The intermediate sumps 20 have a gate 22 that rotates between an open and closed position.

Associated with gate 22 is a sensor 24 that detects the position of gate 22. The sensor 24 is of any type and preferably is comprised of at least one magnet 26 and at least one magnetic reed switch 28. Connected to the sensor, either electrically or wirelessly is a controller 30 having a processor 32, a memory or database 34, and a speaker 36. The controller 30 may also be connected to a plurality of lights 38 positioned about the bin 12 and/or a remote location.

In operation, an operator 40A selects a desired warning signal that includes a voice command, an arbitrary sound, and/or blinking lights. A signal may also be sent to a remote device, such as a mobile phone or personal computer. The warning signal is selected using a laptop or similar remote device 42. When the sensors 24 detect that gates 22 are in an open position, the sensors 24 send signals to the controller 30. Upon receipt of the signal, the controller 30 activates in communication with the controller 30 the selected warning signal. The warning signal continues for a predetermined amount of time or until the controller 30 receives a signal from the sensors 24 indicating the gates 22 are in a closed position.

Upon detection that the gates 22 are in an open position, the controller 30 de-activates unload equipment 40. In one embodiment, the signal sent to the remote device 42 is also sent to deactivate the unload equipment 40. Unload equipment 40 includes any device used in the process of grain removal such as a sweep rotor, auger or drag conveyor. The controller 30 is connected to an actuator 43 connected to the unload equipment 40. Preferably, to re-activate the unload equipment 40 a key lock out switch is used to bypass the deactivation.

Thus, an intermediate sump warning system has been disclosed that at the very least meets all the stated objectives.

What is claimed is:
1. An intermediate sump warning system, comprising:
an intermediate sump disposed in a floor of a grain bin and having a gate that rotates between an open and closed position;
a sensor associated with the gate to detect when the gate is in the open or the closed position; and
a controller connected to the sensor and configured to, when the gate is detected by the sensor as being in the open position, activate a warning signal and deactivate unload equipment.
2. The system of claim 1 wherein the sensor has at least one magnet and at least one magnetic reed switch.
3. The system of claim 1 wherein the warning signal is preselected by an operator.
4. The system of claim 3 wherein the operator preselects the warning signal with a device remote of the controller.
5. The system of claim 1 wherein the warning signal is selected from a group consisting of a voice command, an arbitrary sound, and blinking lights.
6. The system of claim 1 wherein the warning signal continues for a preselected period of time.
7. The system of claim 1 wherein the warning signal continues until the gate is closed.
8. The system of claim 1 wherein the controller sends the warning signal to a remote device.
9. The system of claim 8 wherein the signal sent to the remote device deactivates the unload equipment.
10. The system of claim 1 wherein a key lock switch reactivates the unload equipment.
11. The system of claim 1 wherein the unload equipment is selected from a group consisting of a sweep rotor, an auger, and a drag conveyor.
12. An intermediate sump warning system, comprising:
an intermediate sump disposed in a floor of a grain bin between a centrally located sump and a sidewall of the grain bin and having a gate that rotates between an open and closed position;
wherein the gate is configured to permit removal of grain from the grain bin through the intermediate sump;
a sensor associated with the gate to detect when the gate is in the open or the closed position; and a controller connected to the sensor and configured to, when the gate is detected by the sensor as being in the open position, activate a warning signal and deactivate unload equipment.

13. The system of claim 12 wherein the sensor has at least one magnet and at least one magnetic reed switch.

14. The system of claim 12 wherein the warning signal is preselected by an operator.

15. The system of claim 14 wherein the operator preselects the warning signal with a device remote of the controller.

16. The system of claim 12 wherein the warning signal is selected from a group consisting of a voice command, an arbitrary sound, and blinking lights.

17. The system of claim 12 wherein the warning signal continues for a preselected period of time.

18. The system of claim 12 wherein the warning signal continues until the gate is closed.

19. The system of claim 12 wherein the controller sends the warning signal to a remote device.

20. An intermediate sump warning system, comprising:
    a gate disposed in a floor of a grain bin;
    a sensor associated with the gate to detect when the gate is in an open or closed position; and
    a controller connected to the sensor and configured to, when the gate is detected by the sensor as being in the open position, activate a warning signal and deactivate unload equipment.

21. The system of claim 20 wherein the gate is configured to permit removal of grain from the grain bin.

22. The system of claim 20 wherein the sensor includes at least one magnet and at least one magnetic reed switch.

* * * * *